United States Patent [19]

Schmidt et al.

[11] Patent Number: 4,978,825
[45] Date of Patent: Dec. 18, 1990

[54] THERMOPLASTIC COMPOSITE INDUCTION WELDER

[75] Inventors: Wayne W. Schmidt, Placentia, Calif.; William P. Benjamin, Chandler, Ariz.; Robert A. Grimm, Columbus, Ohio

[73] Assignee: Northrop Corporation, Hawthorne, Calif.

[21] Appl. No.: 433,883

[22] Filed: Nov. 8, 1989

[51] Int. Cl.$^5$ .............................................. H05B 6/10
[52] U.S. Cl. ............................... 219/104.3; 219/10.53; 219/10.69; 219/10.73; 219/10.61 R; 156/274.2; 156/274.6; 156/380.2
[58] Field of Search .......... 219/10.53, 10.79, 10.61 R, 219/10.75, 10.69, 10.71, 10.73, 10.43; 156/272.4, 273.7, 273.9, 274.2, 274,4, 274.6, 379.7, 380.2, 380.3, 380.4, 380.6, 379.6

[56] References Cited

U.S. PATENT DOCUMENTS

| | | | |
|---|---|---|---|
| 2,572,226 | 10/1951 | Walstrom | 219/10.53 |
| 2,629,809 | 2/1953 | Frye | 219/10.53 |
| 2,722,589 | 11/1955 | Marguartdt | 219/10.69 |
| 3,242,026 | 3/1966 | Saxton et al. | 156/272.4 |
| 3,281,566 | 10/1966 | Zelnick | 219/10.53 |
| 3,395,261 | 7/1968 | Leatherman et al. | 219/10.61 R |
| 3,520,053 | 7/1970 | Hinton et al. | 219/10.53 |
| 3,652,361 | 3/1972 | Leatherman | 219/10.53 |
| 3,764,767 | 10/1973 | Randolph | 219/10.79 |
| 3,941,643 | 3/1976 | Balla | 219/10.53 |
| 4,380,484 | 4/1983 | Repik et al. | 219/10.53 |

FOREIGN PATENT DOCUMENTS 0281347 9/1988 European Pat. Off. .

OTHER PUBLICATIONS

Grimm, Robert A. "Progress Report on Manufacturing with Thermoplastic Composites" to A Group of Sponsors Edison Welding Institute, May 17, 1988.

Primary Examiner—Philip H. Leung
Attorney, Agent, or Firm—Terry J. Anderson; Robert B. Block

[57] ABSTRACT

Induction heating of thermoplastic composite materials is accomplished to form a continuous bonded joint. A zone of optimum heating can be created by an induction heating coil mounted within and adjacent to the drum of a hollow circular roller of non-conductive material (i.e., transparent to the RF field) so that an induction heating field can be created and localized to create a zone of optimum heating at the joint area of the material to be bonded. Simultaneously pressure to that area can be applied by the circular roller. In a preferred form, the roller is semi-rigid to permit spreading of the contact surface with the joint area to avoid absolute contact line loading. A hand held induction heating unit with a finger operable power switch can be moved in a back and forth manner over the joint to apply heat when the switch is turned on and effect consolidation when the switch is turned off. Using the techniques of the invention, one can fuse two contacting members which are comprised of filamentary reinforced composite materials in which the matrix resin at the joint interface is a member of the thermoplastic family of polymers. The invention concentrates radio frequency (RF) energy at the joint interface which heats the surrounding layers and simultaneously provides for the application of a controlled force normal to the mid-plane of the joint to retain compaction of the laminates which would normally be relieved in a hot unrestrained condition.

11 Claims, 5 Drawing Sheets

THERMOPLASTIC COMPOSITE INDUCTION WELDER

FIELD OF THE INVENTION

This invention relates to the field of joining thermoplastic materials together by induction heating.

BACKGROUND OF THE INVENTION

It is known, as disclosed in U.S. Pat. No. 3,395,261, to join two overlapped thermoplastic materials together by heating, by induction, a susceptor material that in turn melts the thermoplastic materials which can then be pressed together to form a bond. Prior art devices for accomplishing this, as disclosed in such patent, have included the use of a pair of high frequency current carrying metal rollers to apply heat and pressure to the thermoplastic sheet materials to be joined and to inductively heat a susceptor material of iron oxide particles placed between the sheets of thermoplastic material that are heated and then bonded by the generalized heat thus created and by the pressure of the wheels which may be teflon coated to avoid sticking.

The prior art method discussed above has drawbacks in that the rollers, which are metal and conductive, themselves become heated and cause transfer of heat by conduction to the material to be joined. Sticking of the heated metal rollers to the thermoplastic material is also a problem requiring teflon coating of the pressure rollers for them to be effective. Moreover, the device described in the patent requires two contacts by induction sources on both sides of the relatively thin sheets of thermoplastic material that are being joined.

During induction heating of thermoplastic composites (i.e., thermoplastic materials reinforced with non plastic materials such as glass or carbon fibers) it has been observed that substantial deconsolidation of the laminate may occur which, in the case of reinforcement with susceptor fibers may result in arcing between the spaced fibers. On the other hand, a fully consolidated joint is one where there are substantially no voids between the fibers.

It is also known, according to European Patent Application No. 88301739.4 that pressurizing exposed surfaces of an induction heated laminated thermoplastic joint overcomes the problem of delamination of such surfaces by pressurizing during or immediately subsequent to the welding operation by means of pressure pads or rollers mounted in a fixed relationship in the vicinity of the induction coil, but on the opposite side with the joint to be welded being moved between the two in a fixed direction. This apparatus had the drawback of producing uneven edge heating depending on susceptor fiber orientation and required access to both sides of the joint as well as limiting application of pressure on the weld joint to a single direction.

As a solution to the problems of the above described apparatus, it was proposed in an Edison Welding Institute *Progress Report* dated May 17, 1988, that a welding tool consisting of an induction coil mounted inside a pressure application roller and containing an after-roller for reconsolidation would solve the delamination problem. In the proposed apparatus, an idler roller was used to drive the after roller at the same linear speed as the main roller. However, this apparatus also had its drawbacks resulting from the difficulty of moving the tool in other than a straight line and the continued application of heat and wave effect created by the smaller after rollers if reverse passes were necessary to form a bonded joint.

SUMMARY OF THE INVENTION

The present invention provides a method and apparatus for induction heating thermoplastic composite materials to form a continuous bonded joint utilizing the techniques of positioning the materials to be bonded together to form a mutual joint area and applying induction heating to the joint area by moving the joint area and an induction heating coil relative to each other in a back and forth manner such that the joint area moves through a zone of optimum heating created by the induction heating coil whereby the induction heating is focused at the susceptor material in the joint area. The foregoing is accompanied by applying pressure by means of a non-heated element to said joint area simultaneously with the movement of the joint area through said zone. In a preferred embodiment of the invention, the zone of optimum heating can be created by an induction heating coil mounted within and adjacent to the drum of a hollow circular roller of non-conductive material (i.e., transparent to the RF field) so that an induction heating field can be created and localized to create a zone of optimum heating at the joint area of the material to be bonded. Simultaneously, pressure to that area can be applied by the circular roller acting with or without a support on the opposite side of the material depending on its rigidity. In a further preferred form of the invention, the roller is semi-rigid to permit spreading of the contact surface with the joint area to avoid absolute contact line loading.

Switch means are associated in combination with the induction heating coil to apply electrical power to the coil so that heating can be selectively turned on and off during back and forth movement of the roller surface over the joint area. Heating can be effected when said switch is turned on and consolidation can be effected when said switch is turned off.

Using the techniques of the invention, one can fuse two contacting members which are comprised of filamentary reinforced composite materials in which the matrix resin at the joint interface is a member of the thermoplastic family of polymers. The invention concentrates radio frequency (RF) energy at the joint interface which heats the surrounding layers and simultaneously provides for the application of a controlled force normal to the mid-plane of the joint to retain compaction of the laminates which would normally be relieved in a hot unrestrained condition. In a preferred form of the invention, carbon fibers are combined in the layers adjacent to the joint interface. Carbon's inherent electrical properties permit the filaments to act as susceptors and selectively heat to a temperature above the reforming temperature of the thermoplastic composite materials (e.g., above 650° F. in the case of polyetheretherketone). The combining of metallic implants as suggested materials to augment the ability to induce heating is also contemplated in a preferred form of the invention. The materials to be joined can be passed between the roller and an opposing roller in a stationary device or the roller can be manually rolled over the surfaces in a hand held device, the latter preferably equipped with a stabilizing cam. The apparatus is further adaptable to be used in automated equipment applications capable of effecting relative back and forth movement of the apparatus. The ability to form long continuous joints is a characteristic of all operating modes of the invention as is the ability to operate in multi directional paths.

It was an object for this invention to provide an induction heating apparatus for thermoplastic materials whereby fiber reinforced composite materials can be joined and consolidated by induction heating.

A further object of this invention is to produce structural joints in relatively thick laminates.

These and other objects of the invention will be more fully described with reference to the accompanying drawings showing a preferred embodiment and then alternate preferred embodiment of the invention.

DETAILED DESCRIPTION OF THE INVENTION

Figure 1:
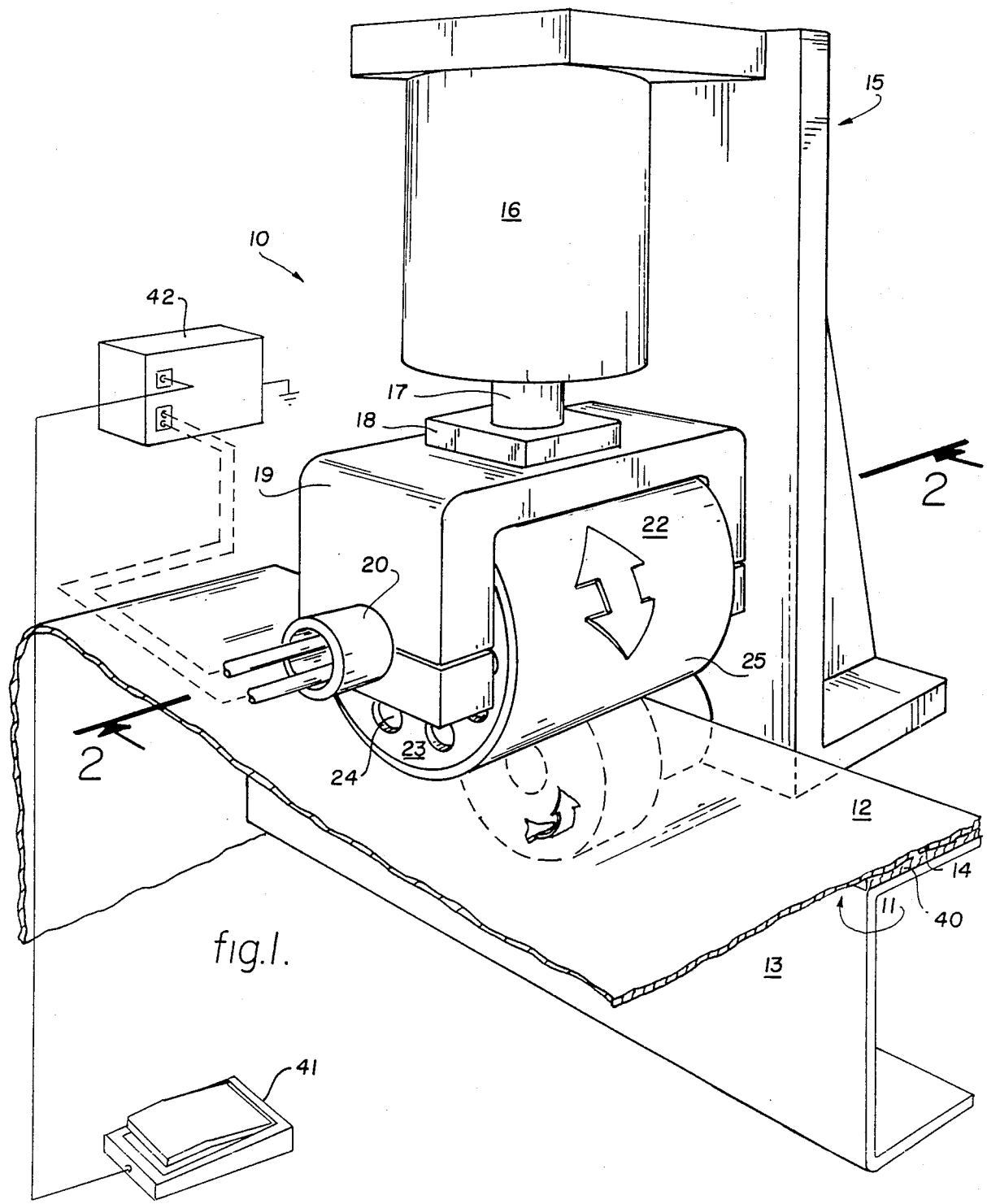
FIG. 1 is a view in perspective showing an embodiment of the apparatus capable of operating with the techniques of the invention.

Referring now to the drawings, there is shown in FIG. 1 an induction heating apparatus 10 for applying selective heating and pressure to a work piece 11. The work piece 11 comprises two sheets 12 and 13 respectively which are bonded together along a mutually overlapping joint area 14.

The induction heating apparatus comprises a frame 15 upon which is pneumatic cylinder 16 is plate 18 to which is mounted yoke 19.

Figure 2:
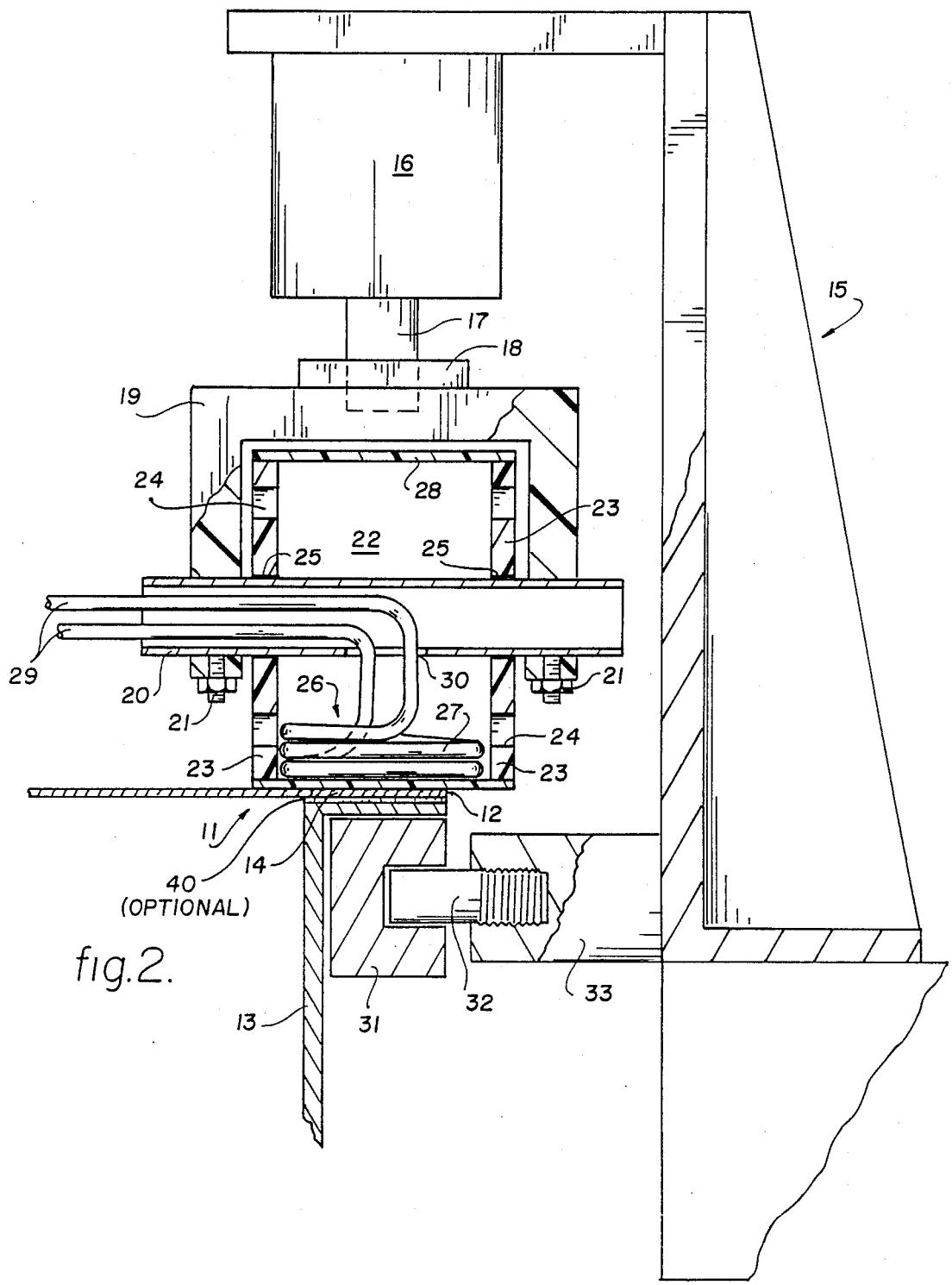
FIG. 2 is a side elevation of the apparatus of FIG. 1 with parts thereof broken away along line 2—2 of FIG. 1 to show internal details of the apparatus.

As best seen in FIG. 2, yoke 19 carries a hollow axle 20 which is fixed in place on yoke 19 by means of set screws 21.

Mounted on hollow axle 20 is roller 22 which is cylindrical in configuration having circular side panels 23 with perforations 24 and axle alignment openings 25, such axle alignment openings 25 being only slightly larger in diameter than the outside diameter of hollow axle 20 to form a suitable bearing arrangement and permit a smooth and uniform rotation of roller 22 about hollow axle 20.

Located within roller 22 is induction coil 26, which includes a coil portion 27 formed of hollow copper tubing which is supported in position in relation to roller drum surface 28 by means of copper tubing leads 29 being through hollow axle 20. Leads 29 extend through an opening 30 in hollow axle 20 and extend outwardly from hollow axle 20 to be connected to a source of cooling water (not shown) which can be passed through the leads 29 to cool the coil 27.

Positioned under roller 22 is a secondary roller 31 mounted for rotation on axial pin 32 which in turn is screw-threaded into extension 33 of frame 15.

Figures 3, 5:
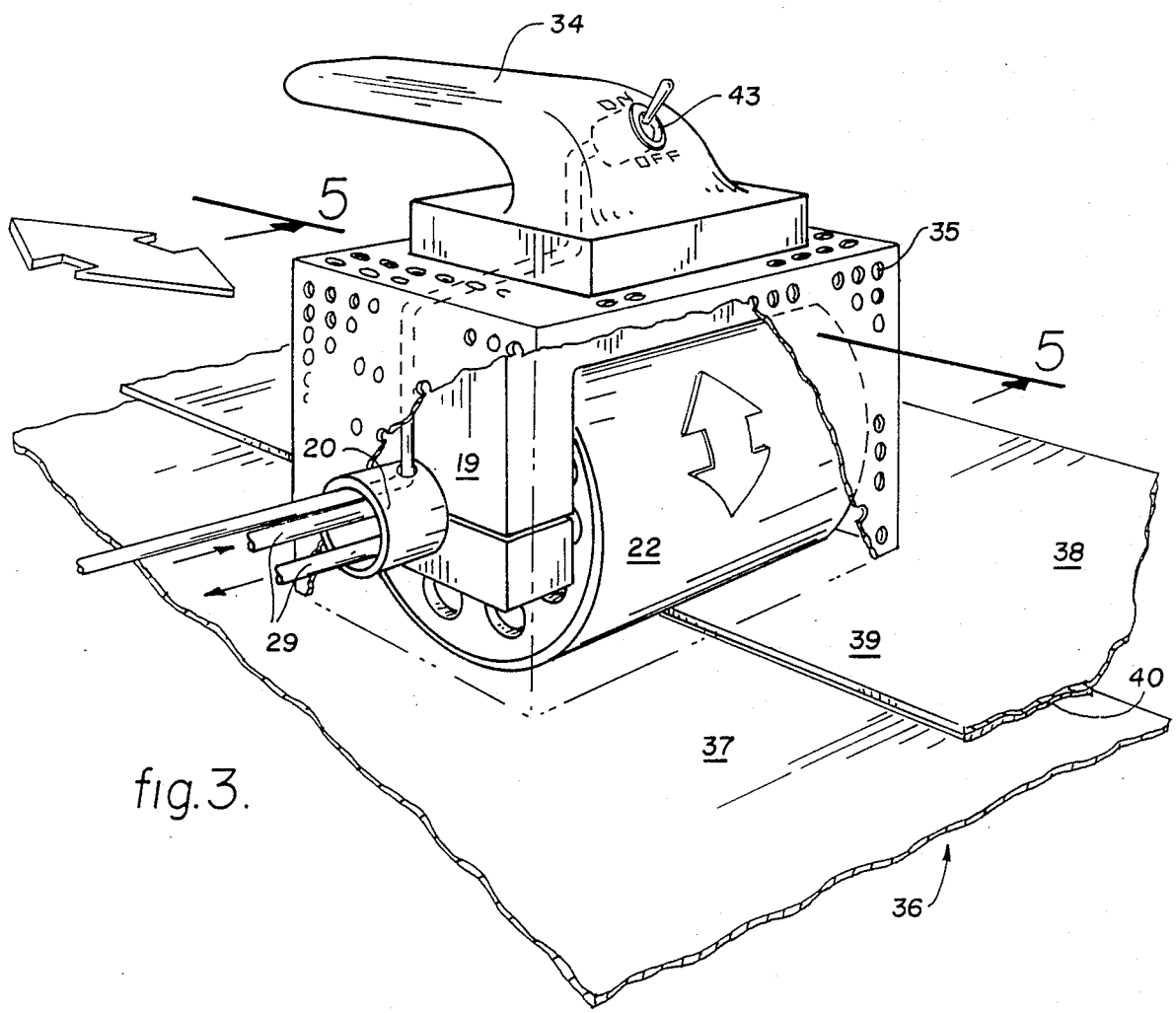
FIG. 3 is a view in perspective showing an embodiment of the invention adapted for hand held operation according to the techniques of the invention.
FIG. 5 is a view in cross section tubes on line 5—5 of FIG. 3.

Referring now to FIG. 3, there is shown thereon an alternate embodiment of the invention adapted for hand-held operation wherein yoke 19, roller 22, hollow axle 20 and induction coil 27 with copper tubing leads 29 are all assembled in the same manner as those components are assembled with respect to each other in the embodiment shown in FIG. 1. To permit hand-held operation, there is provided a handle 34 and a protective Faraday cage 35 which are suitably attached to yoke 19. The Faraday cage 35 prevents escape of RF energy from induction coil 29 except through roller 22. As shown in FIG. 3, the hand-held induction heating apparatus can be used with a work piece 36 comprising two sheets 37 and 38 respectively that overlap in a joint 39. A thin layer of susceptor material 40 can be combined in joint 39.

A foot actuated on-off switch 41 for the induction heating power supply 42 is provided to control the heating by induction coil 29. In the embodiment shown in FIG. 3, a finger actuable on-off switch 43 is provided which is electrically connected to a power supply (not shown) for the same purpose as switch 41.

Roller 22 is constructed of a material that is transparent to RF energy and will not itself be heated by induction heating. A currently preferred such material is a composite plastic material such as glass cloth reinforced silicone resin. Other parts of the induction heating apparatus of the invention are also constructed of materials that will not themselves be heated by induction including yoke 19 which can be fabricated from a non-conductive composite material such as reinforced phenolic on polyimide resin material. Hollow axle 20 is preferred to be constructed of a phenolic resin material. Circular side panels 23 likewise can be constructed of phenolic resin material or other nonconductive material. Secondary roller 27 is also fabricated from a nonconductive material such as a high density polymer.

Roller 22 is preferably semi-rigid to provide spreading of the contact force supplied through the roller to the joint area 14 or 36. In a typical situation, the flexibility of the roller would be such that spreading of the contact area to about 25% of the width of the area being heated will be accomplished (e.g., about $\frac{1}{4}''$ for a $1''$ wide fusion zone).

All the materials of fabrication of yoke 19, hollow axle 20, roller 22 and circular side panels 23, as well as secondary roller 27 must have sufficient structural integrity to withstand the relatively high pressures applied by pneumatic cylinder 16 or hand pressure which can be in the range of up to 60 psi, with a preferred range being about 30 psi to about 60 psi.

Figure 6:
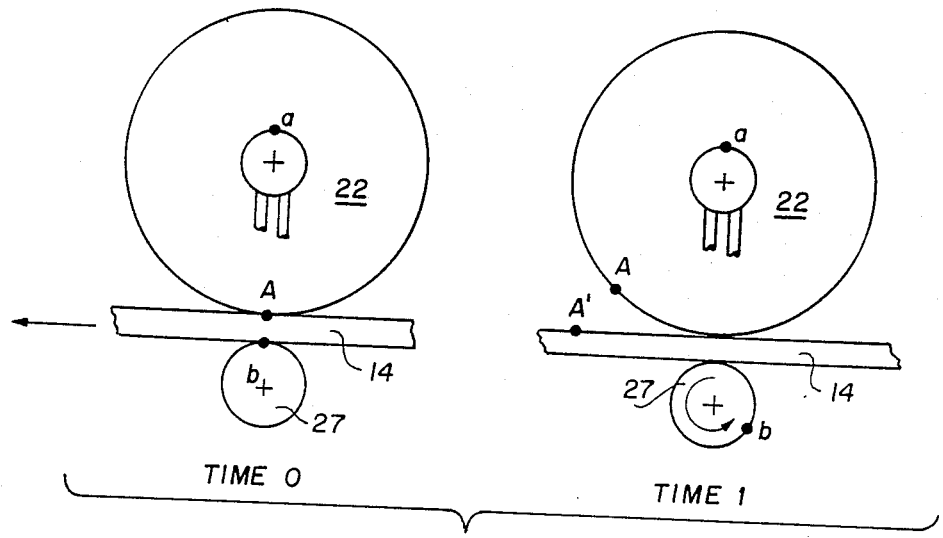
FIGS. 6 and FIG. 7 are schematic drawings showing the operation of the invention.
Figure 7:
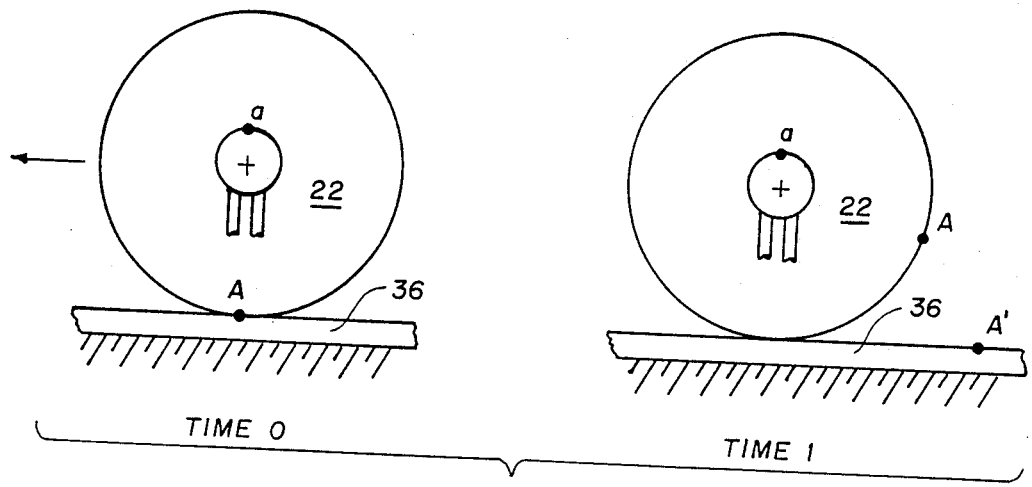
Figure 8:
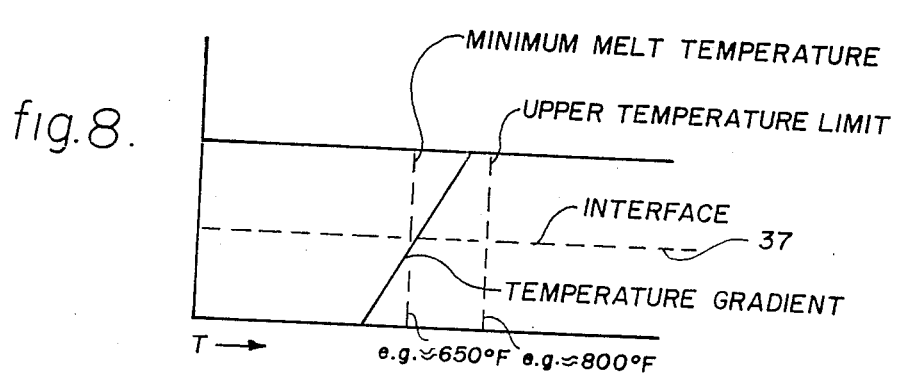
FIG. 8 is a schematic plot showing a typical temperature gradient through a workpiece in accordance with the operation of the invention.

The coil portion 27 of induction coil 26 is located adjacent the inner surface of roller drum 28 to provide optimum heating to work piece 11 in accordance with the invention. It has been found that with this location, the power and frequency applied to the induction heating coil can be controlled to provide optimum heating at the interface of the workpiece materials 12 and 13 or 37 and 38 so that energy is concentrated at the joint interface 39 in the manner depicted schematically in FIG. 6, and so that the bonding joint is heated throughout.

Figure 4:
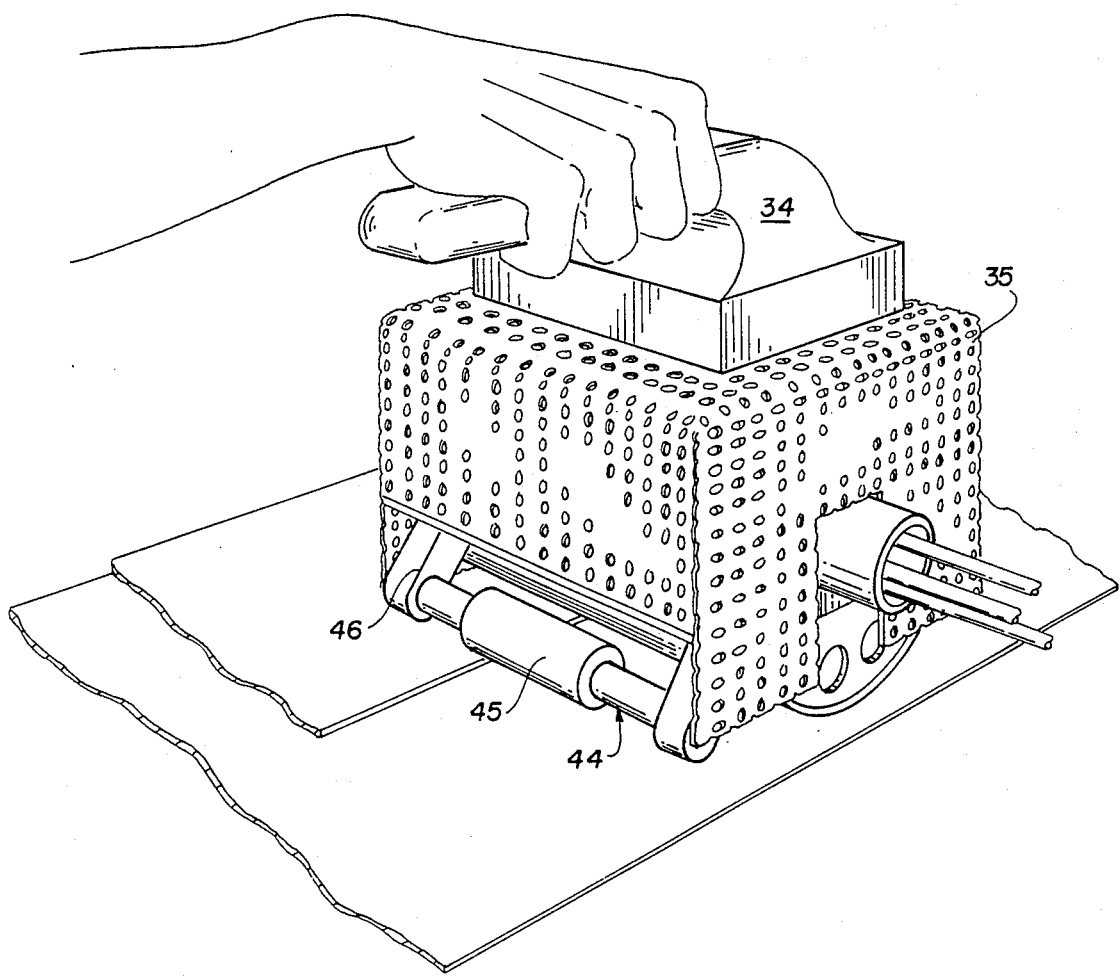
FIG. 4 is a perspective view of the embodiment of the invention shown in FIG. 3.

A stabilizing cam 44 is provided, as shown in FIGS. 4 and 5 for the purpose of aiding the operator of the hand held unit to move it back and forth with even pressure on a joint 39. The stabilizing cam itself does not apply pressure to the joint 39 but merely keeps the unit and the Faraday cage 35 from tipping while the unit is moved back and forth on the workpiece 36. The cam 44 is in the form of a small free idling roller 45 mounted on yoke 19 by means arms 46.

The preferred utilization of the apparatus of the invention is for forming bonded joints between thermoplastic materials which may include one or both composite material for high performance application. Such composite materials, for example, may contain continuous carbon fibers embedded in a thermoplastic matrix resin of poly (ether-ether-ketone), poly (ether-ketone-ether-ketone-ketone), polyetherimide, polyarylene sulfide or polyphenylene sulfide. The carbon filaments themselves are conductive and can serve as the susceptors in the subject invention. A thin layer of susceptor material 40 such as carbon filaments can be placed at the interface of a workpiece joint such as joint 39 to act as a nonmetallic susceptor when joining non-electrically conductive substrates such as those containing glass, quartz or organic filaments.

It has been found, according to the invention, that structural joints, such as joints 14 or 39, can be produced in relatively thick laminates. The upper limits on thickness will be a function of the available power and the amount of force normal to the surface which can be applied. For example, it has been found that joints of nearly 0.20 inches thick can be formed between two 0.10 inch panels which are overlapped using a 5 KW power supply.

In operation, sheet materials such as 12 and 13 can be overlapped to form a joint area 14 and placed between rollers 22 and 31 of induction heating apparatus 10. Appropriate power and cooling water is applied to copper tubing leads 29 to provide controlled induction heating at the interface of such materials. Pneumatic cylinder 16 is actuated to supply the desired pressure on joint 14 and the material or workpiece 11 is passed back and forth through the space between rollers 22 and 31 at a rate and frequency such that optimum heating and consolidation will be attained.

In the operation of an alternative embodiment of the invention, the hand-held induction heating apparatus shown in FIG. 3 is moved by hand in a back and forth manner over joint 39 formed between workpiece sheets 37 and 38, with the application of hand pressure on handle 34 and at a speed and intermittant power application appropriate for the optimum formation and consolidation of a bonded joint 39 in workpiece 36.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. Method of induction bonding of a continuous lap joint between two parts, at least one of which is thermoplastic, along which joint has been laid a susceptor for r-f heating, comprising:
    positioning the parts together, in combination with a susceptor material therebetween in overlapping relationship to form a joint,
    positioning an induction coil on one side of said joint in a plane parallel to the joint for radiating r-f energy into a region of said joint and for heating said susceptor material,
    forming said induction coil as a flat coil,
    simultaneously pressing on said region with a roller made of non-magnetic, non-conductive semi-rigid material mounted about said coil so that said coil lies inside said roller, said roller deforming to establish an area of pressure contact to cover and define an extended region of consolidation over the path of r-f heating in said joint.

2. The method as in claim 1 in which said r-f heating is first applied and then turned off so that said pressing step achieves consolidation of said joint as it cools.

3. A method according to claim 1 wherein said joint is moved relative to said induction coil which is fixed.

4. A method according to claim 1 wherein said joint is fixed and said induction coil is moved relative to said joint.

5. A method according to claim 1 wherein said thermoplastic part is a thermoplastic composite material including uniformly dispersed susceptor material.

6. A method according to claim 1 further including the step of continuously moving said joint and induction coil back & forth relative to each other.

7. A method according to claim 1 further including the step of intermittently moving said joint and induction coil back & forth relative to each other.

8. Apparatus for induction bonding of a continuous lap joint between two overlapped thermoplastic parts along which a joint has been laid on a susceptor for r-f heating,
    means for positioning two thermoplastic materials together, in combination with a susceptor material, in overlapping relationship to form a joint,
    induction heating coil means for radiating r-f energy into a region of said joint for heating said susceptor material, said inductor coil being formed as a flat coil,
    a first roller made of non-magnetic, non-conductive semi-rigid material,
    means for mounting said roller about said coil so that said coil lies inside said roller, and for pressing said roller onto said region of said joint,
    said roller deforming to establish an area of pressure contact to cover and define an extended region of consolidation over the path of the joint, and
    means for mounting said induction coil to lie with its plane generally parallel to said joint and for mounting said pressure roller for rotation in about an axis above and transversly of said joint.

9. An apparatus according to claim 8 further including
    handle means for facilitating relative back and forth movement between said joint and said apparatus.

10. An apparatus according to claims 9 further comprising
    cam means for stabilizing said apparatus, said cam means spaced from said roller, said cam means for stabilizing said apparatus being adapted to contact a surface of said thermoplastic materials whereby said apparatus will be maintained in a stable upright position during pressure application by said roller.

11. An apparatus according to claim 8 further comprising
    a second roller located so as to be on the opposite side of said mutual joint area from said first roller.

* * * * *